United States Patent
Lai et al.

(10) Patent No.: US 11,203,225 B2
(45) Date of Patent: Dec. 21, 2021

(54) WHEEL SPOKE WITH THICKENED EDGES AROUND HEAT DISSIPATION HOLES AND ITS PROCESSING DEVICE

(71) Applicant: ZHENGXING WHEEL GROUP CO., LTD., Zhangzhou (CN)

(72) Inventors: Jianhui Lai, Zhangzhou (CN); Ziyuan Lin, Zhangzhou (CN); Yuncheng Ning, Zhangzhou (CN)

(73) Assignee: ZHENGXING WHEEL GROUP CO., LTD., Zhangzhou (CN)

( * ) Notice: Subject to any disclaimer, the term of this patent is extended or adjusted under 35 U.S.C. 154(b) by 580 days.

(21) Appl. No.: 16/072,075

(22) PCT Filed: Sep. 26, 2016

(86) PCT No.: PCT/CN2016/100092
§ 371 (c)(1),
(2) Date: Jul. 23, 2018

(87) PCT Pub. No.: WO2017/133259
PCT Pub. Date: Aug. 10, 2017

(65) Prior Publication Data
US 2019/0023064 A1    Jan. 24, 2019

(30) Foreign Application Priority Data

Mar. 16, 2016   (CN) .......................... 201620201704.X

(51) Int. Cl.
*B60B 3/10*     (2006.01)
*B60B 3/04*     (2006.01)
(Continued)

(52) U.S. Cl.
CPC ................ *B60B 3/007* (2013.01); *B60B 3/04* (2013.01); *B60B 3/10* (2013.01); *B60B 1/006* (2013.01);
(Continued)

(58) Field of Classification Search
CPC .. B60B 3/007; B60B 3/04; B60B 3/10; B60B 1/006; B60B 1/10; B60B 2310/208;
(Continued)

(56) References Cited

U.S. PATENT DOCUMENTS 2,053,367 A * 9/1936 Hamill ................. F16D 65/827
                                                          301/6.3
2,143,457 A * 1/1939 Sinclair ..................... B60B 3/04
                                                          301/35.625
(Continued)

FOREIGN PATENT DOCUMENTS

CH         231818 A  *  4/1944   ............... B60B 3/04
CN     201009660 Y       1/2008
(Continued)

*Primary Examiner* — Kip T Kotter
(74) *Attorney, Agent, or Firm* — Cooper Legal Group, LLC

(57) ABSTRACT

A lightweight wheel spoke for an automobile increases the strength around the heat dissipation holes by thickening the material around the heat dissipation hole on the inner wall of the spoke. The thinning of the material between the heat dissipation holes, that is where there is no heat dissipation holes on the tapered barrel, enables the tapered barrel of the spoke to form a unique concave-convex structure on the inner wall or the outer wall, thereby enabling the entire spoke to be secured.

7 Claims, 4 Drawing Sheets

(51) Int. Cl.
 B60B 3/00 (2006.01)
 *B60B 1/00* (2006.01)
 *B60B 1/10* (2006.01)

(52) U.S. Cl.
 CPC ........... *B60B 1/10* (2013.01); *B60B 2310/208* (2013.01); *B60B 2310/213* (2013.01); *B60B 2900/111* (2013.01); *B60B 2900/212* (2013.01); *B60B 2900/321* (2013.01); *B60B 2900/513* (2013.01); *Y02T 10/86* (2013.01)

(58) Field of Classification Search
 CPC ......... B60B 2310/213; B60B 2900/111; B60B 2900/513
 See application file for complete search history.

(56) References Cited

U.S. PATENT DOCUMENTS

| | | | | |
|---|---|---|---|---|
| 3,767,267 A | * | 10/1973 | Clement | B60B 3/04 301/6.3 |
| 4,317,597 A | * | 3/1982 | Golata | B21D 53/26 301/63.104 |
| 6,073,347 A | * | 6/2000 | Cvijanovic | B21D 53/26 29/894.322 |
| 2002/0063468 A1 | * | 5/2002 | Vaxelaire | B60B 3/005 301/63.101 |

FOREIGN PATENT DOCUMENTS

| | | |
|---|---|---|
| CN | 101384383 A | 3/2009 |
| CN | 201824784 U | 5/2011 |
| CN | 202294043 U | 7/2012 |
| CN | 102950240 A | 3/2013 |
| CN | 103568692 A | 2/2014 |
| CN | 103963561 A | 8/2014 |
| CN | 204687721 U | 10/2015 |
| CN | 105109273 A | 12/2015 |
| CN | 105774388 A | 7/2016 |
| CN | 205380244 U | 7/2016 |
| CN | 205416985 U | 8/2016 |
| CN | 205631927 U | 10/2016 |
| JP | 2000255202 A | 9/2000 |
| JP | 2002086233 A * | 3/2002 |

* cited by examiner

WHEEL SPOKE WITH THICKENED EDGES AROUND HEAT DISSIPATION HOLES AND ITS PROCESSING DEVICE

TECHNICAL FIELD

The invention relates to an automobile wheel disc and processing device. More specifically, it involves a wheel disc with thickened edges around heat dissipation holes and its processing device.

BACKGROUND TECHNIQUE

The wheel is a support for transmitting the force of the body and the road when the vehicle is walking, and is equivalent to the foot of the vehicle, and generally consists of a rim and a wheel disc. The rim and wheel disc are welded together, and the rim is fitted with a tire. The wheel disc has a mounting hole connected to the vehicle bridge. The wheel discs are the main force-receiving parts when the wheel is subjected to the supporting load and the torque is transmitted, especially the heavy vehicles, such as truck and bus, and the bearing capacity and safety of the wheel disc are more demanding.

The reality is that in the actual use process, due to the need of the vehicle to dissipate the heat of the wheel, it is necessary to manufacture a heat dissipation hole (also called a wind hole) at the tapered barrel body of the wheel disc. Here, the strength is weakened, and the crack is often broken from the use process. More, the wheel has a short service life.

SUMMARY OF THE INVENTION

The object of the present invention is to overcome the deficiencies of the prior art and to provide a wheel disc and a processing device for increasing the peripheral strength of the heat dissipation hole while achieving a lightweight wheel.

The technical scheme of the invention is as follows:

A wheel disc with thickened edges around heat dissipation holes, comprising a mounting surface, the tapered barrel; the heat dissipation holes are provided in the tapered barrel, the thickness of the wheel disc around the heat dissipation holes edge is larger than the thickness of the wheel disc between the heat dissipation holes, the tapered barrel around the heat dissipation holes extends a certain thickness protruding portions in the thickness direction.

Preferably, the protruding portions is arranged on the inner wall of the tapered barrel.

Preferably, the protruding portions extends from the mounting surface toward the opening of the tapered barrel body, covering the periphery of the heat dissipation holes.

Preferably, the side of the protruding portions facing the opening direction of the tapered barrel is curved in an arc and is not connected to the opening of the tapered barrel.

Preferably, the protruding portions is arranged on the outer wall of the tapered barrel.

Preferably, the protruding portions extends from the mounting surface toward the opening of the tapered barrel and covers the periphery of the heat dissipation holes.

Preferably, the protruding portions is striped structure, and both sides of the protruding portions are connected with the opening of the mounting surface and the tapered barrel respectively.

Another technical scheme of the invention is as follows:

A processing device for wheel disc with thickened edges around heat dissipation holes includes: a mould, a rotary forging machine, a punching mechanism;

the top part of the mould is a rotary forging positioning device, which is used for positioning the blank member on the mould; the side wall of the mould is a tapered barrel surface, and the side wall is provided with a protruding portion mould;

the rotary forging machine, including; a rotary forging drive shaft, a press device, a rotary wheel, the rotary forging shaft is connected to the bottom of the mould, the press device is provided above the mould, and the rotary wheel is provided on the side of the mould; in processing, the main rotating shaft, the mould and the press device rotate synchronously, the rotary wheel moves up and down and right and left in the side of the mould, extruding the blank member towards the mould direction, and getting the rotary forging member;

the punching mechanism includes a punching positioning device, a punching drive shaft, a punching upper mould and a punching lower mould, the punching drive shaft is connected to the bottom of the punching positioning device, the punching positioning device is used to locate the rotary forging member on the punching mechanism, the punching lower mould is aligned with the protruding portions of the inner wall of the rotary forging member, and the punch is aligned with the punching lower mould.

Preferably, a number of protruding portion moulds are evenly distributed on the side walls.

Preferably, the protruding portion mould extends from the top edge of the mould to the side wall.

Preferably, the protruding portion mould is curved in an arc toward one side of the lower edge of the side wall and is not connected to the lower edge of the side wall.

Preferably, the rotary forging positioning device is a protruding rotary forging positioning table; when processing and positioning, the axle positioning hole of the blank member is sleeved on the rotary forging positioning table.

Preferably, the punching drive shaft is tilted, the rotary forging member is positioned on the punching positioning device, and the protruding portions of the rotary forging member is horizontal.

Preferably, the punching positioning device is a protruding punching positioning table. When the punching is positioned, the axle positioning hole of the rotary forging member is sleeved on the punching positioning table.

The beneficial effects of the invention are as follows:

The wheel discs of the invention increase the strength around the heat dissipation holes through the thickening of the material around the heat dissipation holes of the inner wall of the wheel disc, thereby increasing the overall service life of the wheel disc. The thinning of the material between the heat dissipation holes (That is where there is no heat dissipation holes on the tapered barrel) enables the tapered barrel of the wheel disc to form a unique concave-convex structure on the inner wall or the outer wall, thereby enabling the entire wheel disc to be secured. Under the premise that the bearing capacity of the wheel is not affected, not only the overall strength of the wheel disc is improved, but also the amount of material for manufacturing the wheel disc is used reasonably and effectively, and the weight of the wheel disc is reduced, thereby reducing the weight of the whole vehicle and reducing the fuel consumption.

Based on the detection data, the invention can effectively enhance the fatigue strength and prolong the service life of the wheel disc.

The invention is applicable to large vehicles such as trucks, buses, etc., and is a new innovation improvement for the wheel disc of existing automobiles.

Figure 1:
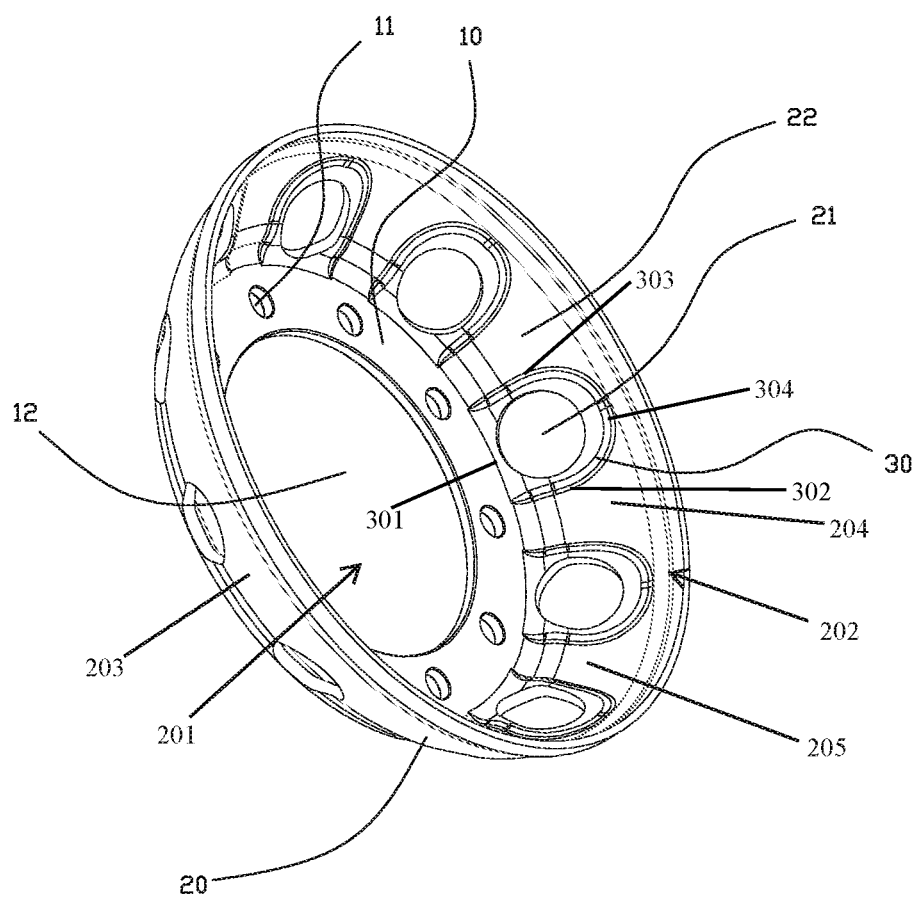
FIG. 1 is a schematic diagram of the embodiment 1.

The 10 is the mounting surface, the 11 is the bolt hole, the 12 is the positioning hole of the axle, the 20 is the tapered barrel, the 21 is the heat dissipation holes, the 22 is the inner wall, the 30 is the protruding portions, the 40 is the mould, the 41 is the rotary forging positioning table, the 42 is the tapered barrel surface, the 43 is the protruding portion mould, the 50 is the rotary forging machine, the 51 is the rotary forging drive shaft, the 52 is the press device, the 53 is the rotary wheel, the 60 is the punching mechanism, the 61 is punching positioning table, the 62 is punching drive shaft, the 63 is punching upper mould, 64 is punching lower mould, the 70 is blank member, the 80 is rotary forging member.

DETAILED DESCRIPTION

The following is further explained in detail with the accompanying drawings and embodiments.

The present invention is to overcome the deficiencies of the prior art wheel discs, which are 15 easy to crack around the heat dissipation holes, and provide a wheel disc with thickened edges around the heat dissipation holes, including the mounting surface 10 and the tapered barrel 20; the heat dissipation holes 21 is arranged on the tapered barrel 20, and the wheel disc thickness around the heat dissipation holes 21 is larger than the wheel disc thickness between the heat dissipation holes 21. The strength around the heat dissipation holes 21 is increased, and the material between the heat dissipation holes 21 is thinned, so that the wheel discs form a unique concave-convex structure, so that the entire wheel disc can improve the overall strength of the wheel disc and increase the overall service life of the wheel discs without affecting the bearing capacity of the wheel. Moreover, the amount of material used for manufacturing the wheel disc is reduced, and the weight of the wheel disc is reduced, thereby it reduces the weight of the whole vehicle and the fuel consumption.

In the invention, the tapered barrel 20 around the heat dissipation holes 21 extends a certain thickness of protruding portions 30 in the thickness direction, and increases the thickness of the edge of the heat dissipation holes 21 by setting the protruding portions 30. The protruding portions 30 and the tapered barrel 20 have a stepped structure or a smooth transition.

Embodiment 1

As shown in FIG. 1, the wheel disc structure of the invention is a tapered shaped cylinder. Two opposite ends of the tapered barrel 20 respectively comprise a first opening 201 and a second opening 202, an annular mounting surface 10 is disposed on the first opening 201 of the tapered barrel 20, the tapered barrel 20 comprises an outer convex surface 203 and an inner concave surface 204, heat dissipation holes 21 penetrate the outer convex surface 203 and the inner concave surface 204 of the tapered barrel 20, portions of the inner concave surface 204 of the tapered barrel 20 disposed around the heat dissipation holes 21 protrudes inward to define a plurality of protruding portions 30 in a thickness direction of the tapered barrel 20, and an inner wall of the tapered barrel 20 disposed between every two adjacent protruding portions of the plurality of protruding portions 30 defines concave portions 205. A diameter of the first opening 201 is smaller than a diameter of the second opening 202. The annular mounting surface 10 is uniformly provided with bolt holes 11 for the whole wheel fixed, the center of the annular mounting surface 10 is the axle positioning hole 12. The heat dissipation holes 21 are uniformly distributed on the tapered barrel 20 of the tapered shaped cylinder of the wheel disc, and the heat dissipation holes 21 are through holes, and the number and size of the heat dissipation holes 21 can be varied. The design of the heat dissipation holes 21 can not only reduce the weight of the wheel disc, but also play a role in lowering the temperature of the wheel disc. The heat dissipation holes 21 may be circular holes, elliptical holes or other shapes of through holes. As a preferred embodiment of the invention, the heat dissipation holes 21 are circular holes, and the axis of the circular holes are perpendicular to the tapered barrel 20 of the tapered shaped cylinder profile.

The tapered barrel 20 of the edge position of the heat dissipation holes 21 extends the protruding portions 30 with a certain thickness in the thickness direction, and the protruding portions 30 is provided at the inner wall 22 of the tapered barrel 20, and the outline of the inner wall 22 of the tapered barrel 20 forms a concave and convex structure to enhance the strength around the heat dissipation holes 21. Because the material between the heat dissipation holes 21 and the heat dissipation holes 21 is thinner, the weight of the wheel disc is greatly reduced, and the bearing capacity is increased while the service life is increased.

In this embodiment, the protruding portions 30 extends from the mounting surface 10 to the opening of the tapered barrel 20, covering the periphery of the heat dissipation holes 21. The protruding portions 30 is curved in an arc to the side of the opening direction of the tapered barrel 20, and is not connected with the opening of the tapered barrel 20.

The protruding portions 30 comprise first sides 301, second sides 302, bottom straight sides 303 facing the first opening 201 of the tapered barrel 20, and top curved sides 304 facing the second opening 202 of the tapered barrel 20. The first sides 301 and the second sides 302 are straight, and the first sides 301 are connected to the bottom straight sides 303 and the top curved sides 304. The second sides 302 are connected to the bottom straight 303 sides and the top curved sides 304, and the bottom straight sides 303 are connected to and overlap with an edge of the first opening 201 of the tapered barrel 20.

Embodiment 2

Figure 2:
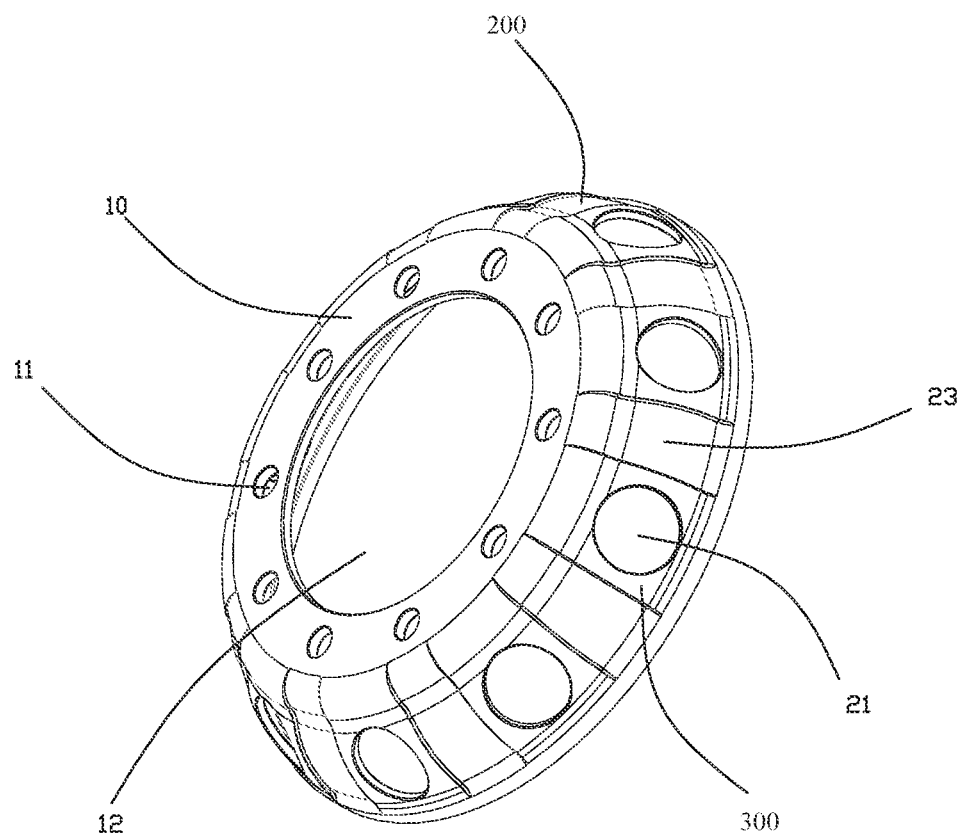
FIG. 2 is a schematic diagram of the embodiment 2.

As shown in FIG. 2, in this embodiment, a protruding portions 300 is arranged on the outer wall 23 of a tapered barrel 200. The protruding portions 300 extends from the mounting surface 10 to the opening of the tapered barrel 200, and covers the periphery of the heat dissipation holes 21. The protruding portions 30 is striped structure, and the two sides of the protruding portions 300 are respectively connected with the mounting surface 10 and the tapered barrel 200.

The other parts are the same as those of embodiment 1.

Embodiment 3

In the embodiment, the inner wall 22 and the outer wall 23 of the tapered barrel 20 are provided with a protruding portions 30.

The other parts are the same as those of the embodiment 1 and the embodiment 2.

A device for processing the above wheel disc includes: The mould 40, the rotary forging machine 50, the punching mechanism 60. The rotary forging machine 50 is used to forged the blank member 70 to get the rotary forging member 80 with the protruding portions 30, and the punching mechanism 60 is used for stamping the heat dissipation holes 21 for the rotary forging member 80, to obtained the finished product of the wheel disc.

Figure 3:
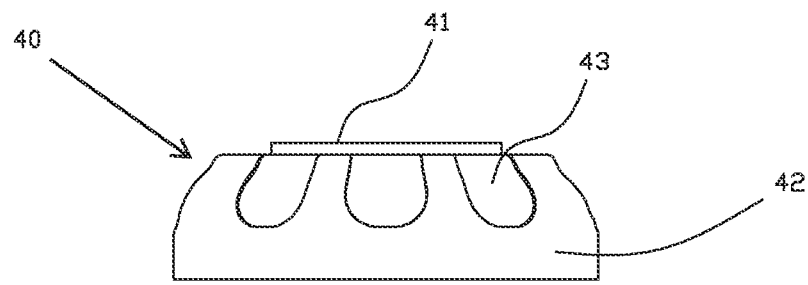
FIG. 3 is a schematic diagram of the mould.

As shown in FIG. 3, the top surface of the mould 40 is a rotary forging positioning device, which is used to locate the blank member 70 on the mould 40. The side wall of the mould 40 is a tapered barrel surface 42, and the side wall is provided with a protruding portion mould 43. A number of protruding portion mould 43 are distributed on the side wall. The protruding portion mould 43 extends from the top edge of the mould 40 to the side wall. The protruding portion mould 43 is curved in an arc on the side of the lower edge of the side wall, and is not connected with the lower edge of the side wall.

The rotary forging positioning device is a protruding rotary forging positioning table 41. When processing and positioning, the axle positioning hole 12 of the blank member 70 is provided on the rotary forging positioning table 41.

Figure 4:
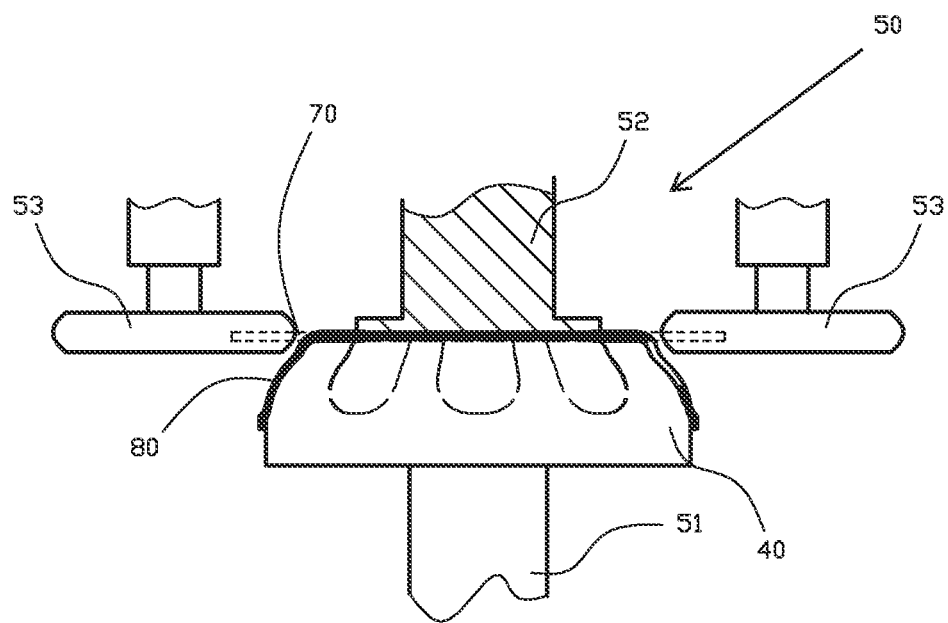
FIG. 4 is a schematic diagram of the rotary forging machine.

As shown in FIG. 4, the rotary forging machine 50 includes a mould 40, a rotary forging drive shaft 51, a press device 52, a rotary wheel 53, and the rotary forging drive shaft 51 is connected to the bottom of the mould 40, and the press device 52 is provided above the mould 40, and the rotary wheel 53 is provided on the side surface of the mould 40. During processing, the main drive shaft, the mould 40 and the press device 52 rotate synchronously, and the rotary wheel 53 moves up and down and right and left of the sides of the mould 40, and extruding the blank member 70 in the direction of the mould 40 to get the rotary forging member 80.

Figure 5:
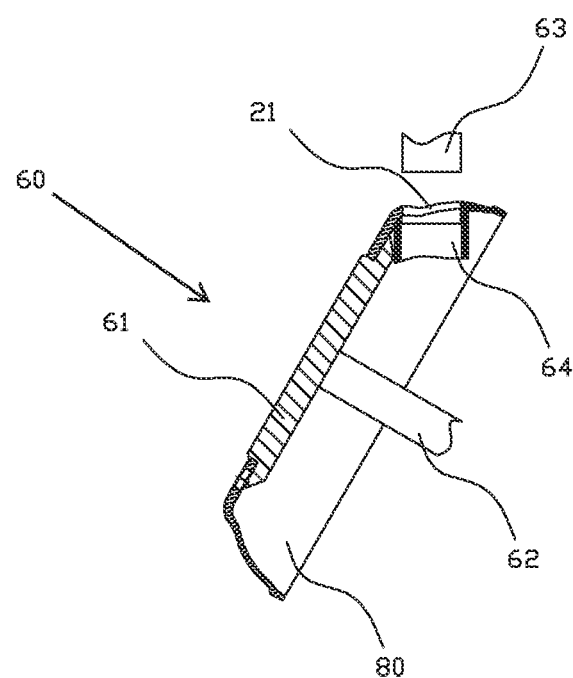
FIG. 5 is a schematic diagram of the punching mechanism.

As shown in FIG. 5, the punching mechanism 60 comprises a punching positioning device, a punching drive shaft 62, a punching upper mould 63, a punching lower mould 64, the punching drive shaft 62 is connected to the bottom of the punching positioning device, and the punching positioning device is used for positioning the rotary forging member 80 on the punching mechanism 60, the punching lower mould 64 is aligned with the protruding portions 30 of the inner wall of the rotary forging member 80, and the punching upper mould 63 is aligned with the punching lower mould 64.

In order to make the punching upper mould 63 and the punching lower mould 64 more stable when punching holes, the good product rate is higher, the punching drive shaft 62 is tilted, the rotary forging member 80 are positioned on the punching positioning device, and the protruding portions 30 of the rotary forging member 80 is in a horizontal angle. When punching upper mould 63 and punching lower mould 64 are punching holes, the force of the protruding portions 30 is uniform, and the rate of punching good products is high.

The punching positioning device is a protruding punching positioning table 61. When punching and positioning, the axle positioning holes 12 of the rotary forging member 80 are arranged on the punching positioning table 61.

The manufacture of wheel disc by manufacturing equipment is as follows:

1) rotary forging:

1.1) according to the designed wheel disc structure, the mould 40 can be designed and manufactured;

1.2) the manufactured mould 40 is installed on the rotary forging drive shaft 51 of the rotary forging machine 50.

1.3) the circular blank member 70 is placed on the mould 40, and the mould 40 is equipped with a rotary forging positioning device for the positioning blank member 70.

1.4) the press device 52 is pressed down, and the blank member 70 is compressed;

1.5) starting the rotary forging machine 50, the rotary forging drive shaft 51 rotates, and simultaneously drives the mould 40, the blank member 70, and the press device 52 to rotate together;

1.6) according to the programmed program, the rotary wheel 53 is moved up and down and left and right so that the shape and outline of the wheel disc can be forged. Since the mould 40 is provided with a concave and convex shape, when the rotary wheel 53 moves up and down and left and right, the blank member 70 is pressed to cause the blank member 70 to flow into the protruding portion mould 43 of the mould 40, thereby making the inner wall of the tapered barrel 20 of the wheel disc is formed into a concave and convex shape to obtain a rotary forging member 80;

1.7) the rotary forging machine 50 stops running, and the press device 52 moves upwards, and the rotary wheel 53 moves upward to take out the rotary forging member 80.

2) punching the heat dissipation holes 21:

2.1) the rotary forging member 80 is placed on the punching positioning device, and the protruding portions 30 of the inner wall of the tapered barrel 20 of the wheel disc is aligned with the punching lower mould 64;

2.2) actuating the press to make the punching mould 63 move downward, and punching the heat dissipation holes 21 by the punching upper mould 63 and the punching lower mould 64;

2.3) the punching upper mould 63 moves upward, rotating products, the punching upper mould 63 moves downward, punching out heat dissipation holes 21;

2.4) cycle step 2.3) until all heat dissipation holes 21 are stamped out.

The above embodiments are only used to illustrate the invention, but not to define the invention. As long as it is based on the technical essence of the invention, the changes and variants of the above embodiments will fall within the scope of the claims of the invention.

INDUSTRIAL APPLICABILITY

The lightweight wheel disc of the automobile of the invention adopts the thickening of the material around the heat dissipation holes on the inner wall of the wheel disc, so that the strength around the heat dissipation holes is improved, thereby increasing the overall service life of the wheel disc, and is used for large vehicles such as trucks and buses. It is new and innovative improvements to the wheel discs of existing vehicles.

The invention claimed is:

1. A wheel disc with thickened edges around heat dissipation holes, comprising:
   a mounting surface, and
   a tapered barrel, wherein:
   two opposite ends of the tapered barrel respectively comprise a first opening and a second opening,
   the mounting surface is disposed on the first opening of the tapered barrel,
   the heat dissipation holes penetrate a side wall of the tapered barrel,
   axes of the heat dissipation holes are perpendicular to the tapered barrel,
   portions of the tapered barrel disposed around the heat dissipation holes protrude to define a plurality of protruding portions in a thickness direction of the tapered barrel,
   every two adjacent protruding portions of the plurality of protruding portions are separated to define a concave portion, and
   the concave portion is gradually enlarged in a radial direction of the wheel disc extending towards the second opening.

2. The wheel disc with the thickened edges around the heat dissipation holes according to claim 1, wherein:
   a diameter of the first opening of the tapered barrel is smaller than a diameter of the second opening of the tapered barrel, and
   the plurality of protruding portions extend from the mounting surface toward the second opening of the tapered barrel.

3. The wheel disc with the thickened edges around the heat dissipation holes according to claim 2, wherein sides of the plurality of protruding portions facing the second opening of the tapered barrel are curved in arcs and are not connected to the second opening of the tapered barrel.

4. The wheel disc with the thickened edges around the heat dissipation holes according to claim 1, wherein portions of an inner concave surface of the tapered barrel disposed around the heat dissipation holes protrude inward to define the plurality of protruding portions.

5. The wheel disc with the thickened edges around the heat dissipation holes according to claim 1, wherein:
   the plurality of protruding portions comprises first sides, second sides, bottom straight sides, and top curved sides,
   the first sides and the second sides are straight,
   the first sides are connected to the bottom straight sides and the top curved sides, and
   the second sides are connected to the bottom straight sides and the top curved sides.

6. The wheel disc with the thickened edges around the heat dissipation holes according to claim 1, wherein:
   the plurality of protruding portions comprises bottom straight sides facing the first opening of the tapered barrel,
   the bottom straight sides are opposite to sides of the plurality of protruding portions facing the second opening of the tapered barrel, and
   the bottom straight sides are connected to and overlap with an edge of the first opening of the tapered barrel.

7. The wheel disc with the thickened edges around the heat dissipation holes according to claim 1, wherein the heat dissipation holes are circular in shape.

* * * * *